US009633549B2

(12) United States Patent
Lyman et al.

(10) Patent No.: US 9,633,549 B2
(45) Date of Patent: Apr. 25, 2017

(54) EMERGENCY AUTO-NOTIFICATION (71) Applicant: PAYPAL, INC., San Jose, CA (US)

(72) Inventors: Nathan Lyman, Livermore, CA (US);
Roy Leon Camp, Cupertino, CA (US);
David Eramian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 377 days.

(21) Appl. No.: 14/031,631

(22) Filed: Sep. 19, 2013

(65) Prior Publication Data

US 2015/0077244 A1 Mar. 19, 2015

(51) Int. Cl.
*G08B 25/01* (2006.01)
*H04W 76/00* (2009.01)
*B60R 21/00* (2006.01)
*G08B 27/00* (2006.01)
*H04W 4/22* (2009.01)

(52) U.S. Cl.
CPC ......... *G08B 25/016* (2013.01); *G08B 27/005* (2013.01); *B60R 2021/0027* (2013.01); *G08B 27/001* (2013.01); *G08B 27/006* (2013.01); *H04W 4/22* (2013.01); *H04W 76/007* (2013.01)

(58) Field of Classification Search
CPC .................................................. G08B 25/016
USPC .................................................... 340/539.12
See application file for complete search history.

(56) References Cited

U.S. PATENT DOCUMENTS

| 7,076,235 B2 * | 7/2006 | Esque | H04M 3/42 455/404.1 |
|---|---|---|---|
| 7,221,928 B2 * | 5/2007 | Laird | A61B 5/04 340/539.12 |
| 7,817,982 B1 * | 10/2010 | Chu | G08B 27/006 379/45 |
| 8,522,258 B1 * | 8/2013 | Shaw | G06F 9/542 719/318 |
| 9,071,957 B2 * | 6/2015 | Stadtlander | H04W 4/22 |
| 2005/0151642 A1 * | 7/2005 | Tupler | G08B 25/08 340/539.18 |
| 2006/0009191 A1 * | 1/2006 | Malone, III | H04W 4/22 455/404.1 |
| 2013/0231072 A1 * | 9/2013 | Anderson | H04W 4/22 455/404.1 |
| 2013/0231077 A1 * | 9/2013 | Cahill | H04W 4/22 455/404.2 |

* cited by examiner

*Primary Examiner* — Steven Lim
*Assistant Examiner* — Benyam Haile
(74) *Attorney, Agent, or Firm* — Haynes and Boone, LLP (57) ABSTRACT

According to an embodiment, methods and systems can provide emergency auto-notification. Thus, in the event of an emergency, such as a predefined emergency, one or more people can be notified of a user's condition, needs, environment, and location, for example. The people to be notified can be predetermined, such as during a set up procedure. The people to be notified can be notified by text messaging, email, vice, voice mail, or any other method. The notification can be triggered by any desired criteria. For example, the notification can be triggered by the user's condition, location, or environment.

21 Claims, 4 Drawing Sheets

EMERGENCY AUTO-NOTIFICATION

BACKGROUND

Technical Field

The present disclosure generally relates to electronic communications and, more particularly, relates to methods and systems for emergency auto-notification, such as for notifying a contact regarding an emergency situation involving a user when the user is unable to communicate.

Related Art

Emergency situations are too common. Emergency situations can result from accidents, crimes, natural disasters, diseases, and the like. In some instances, an emergency situation can cause a person to require help, such as medical care. Sometimes, the person requiring help is unable to communicate. For example, the person requiring help can be unconscious and in serious need of medical care. Such emergency situations can be life threatening. An immediate and appropriate response can be necessary to save the life of the person who needs help.

Important information, such as the condition, needs, and/or location of the person requiring help, can be unknown those who need this information in order to respond to the emergency. Such others can be capable of providing help, if they have this information. For example, police officers and other emergency responding personnel need to know the location of the person requiring help and need to know the nature of the emergency. As a further example, emergency medical personnel, such as emergency medical technicians (EMT's) and emergency room physicians, need information regarding the person's medical condition, such as the person's vital signs, as soon as possible.

For example, a person with diabetes can be in a diabetic coma and in the emergency room of a hospital. The condition and location of the person who is in the diabetic coma can be unknown to others who can help if they have this information. Such others can help, for example, by providing important information (such as the fact that the person has diabetes and/or needs insulin) to attending medical personnel.

The person in the diabetic coma can be incapable of communicating the emergency to others. The person can be incapable of communicating important information (such as the fact that the person is diabetic and/or needs insulin) regarding the emergency to attending medical personnel. Thus, the attending medical personnel must take time to determine the person's condition. If there is not enough time, the person's condition can worsen, possibly to the point of being life threatening.

Other people, including those who are not able to help, may need to know of the emergency. For example, if the person will not be able to attend a meeting or will not be able to join in an activity with others, then there may be a need for the others to be aware that the person cannot attend the meeting or join in.

BRIEF DESCRIPTION OF THE DRAWINGS

The included drawings are for illustrative purposes and serve only to provide examples of possible systems and methods for the disclosed emergency auto-notification. These drawings in no way limit any changes in form and detail that may be made to that which is disclosed by one skilled in the art without departing from the spirit and scope of this disclosure.

DETAILED DESCRIPTION

According to an embodiment, methods and systems can provide emergency auto-notification. The emergency auto-notification can help to provide an immediate and appropriate response to an emergency, such as when a user who requires help is unable to communicate, e.g., is unable to request help.

Thus, in the event of an emergency one or more people can be notified of a user's condition, needs, environment, and location, for example. The people to be notified can be predetermined, such as during a set up procedure. The people to be notified can be notified by text messaging, email, voice, voice mail, or any other method. The notification can be triggered by any desired criteria. For example, the notification can be triggered by the user's condition, location, and/or environment.

The emergency can be a predefined emergency. Thus, the emergency can be indicated by criteria that defines a particular emergency. For example, a medical emergency can be indicated by a blood glucose level that is too low or too high. As a further example, a house fire can be indicated by the presence of smoke, heat, and/or fire at the location of a house. As yet a further example, a traffic accident can be indicated by an abrupt stop and/or deployment of an airbag on a freeway. Sensors, such as those of a user mobile device, can detect blood glucose levels, smoke, heat, fire, acceleration (deceleration), deployment of an airbag (such as via electronic signals, an acceleration or shock profile or spectrum, sound, the presence of the powder used to pack the airbag, the presence of the spent explosive used to deploy the airbag), body temperature change, pulse rate/heart beat change, and the like.

The emergency can be an emergency that is not predefined. The emergency can be indicated when the system recognizes a situation that is consistent with an emergency. For example, a medical emergency can be indicated by biometric information of the user not being consistent with normal or non-emergency biometric information of the user. As a further example, a building emergency can be indicated by structural information (such as temperature, humidity, pressure, the presence of water, the presence of smoke) not being consistent with normal or non-emergency information for the building. As yet a further example, a traffic emergency can be indicated by the user not moving on a roadway in the same manner (at the same speed or in the same direction, for example) as the user generally moves on the roadway at a particular time of day.

The user can be unable or unwilling to communicate. For example, the user can be unconscious. As a further example, the user can be conscious and injured such that the injury inhibits communication. As yet a further example, the user can be busy or otherwise engaged (such as driving an automobile) and thus unable or unwilling to communicate.

Thus, an emergency can be any situation or event wherein the user is unable or unwilling to communicate. Thus, an emergency may be determined using one or more of sensed environmental conditions by the user device, sensed biometric information of the user by the user device, location of the user device, time or day, etc. For example, the system may determine an emergency when the user is detected at a hospital location at 3 a.m. in the morning, indicating a possible emergency room situation. If there is no motion detected for the user device, the system may assume the user's belongings have been removed, such as in a situation where the user in an emergency room situation. The user's biometrics may also aid in the determination, such as lower pulse rate, higher pulse rate, lower body temperature, etc. Changes in biometrics and/or environment can be indicative of emergencies.

According to an embodiment, the notification can occur automatically, such as without intervention from the user when an emergency is determined. Thus, the communication can occur when the user is unable or unwilling to communicate.

According to an embodiment, the user can be provided with the ability to abort the communication. For example, if the user is able and willing to communicate, the user may want to abort the emergency auto-communication and/or perform any desired communication personally. The default can be for the emergency auto-communication system to perform auto-notification if the user does not abort the communication within a certain period of time.

According to an embodiment, important information, such as the condition, needs, and/or location of a person requiring help can be communicated to others who can use this information to help the person in need. For example, information, such as the location of the person requiring help and the nature of the emergency, can be provided to police officers and other emergency responding personnel. As a further example, information regarding the person's medical condition, such as the person's vital signs emergency, can be provided to medical personnel, such as emergency medical technicians (EMT's) and/or physicians.

According to an embodiment, other people, including those who are not able to help, may need to know of the emergency. For example, if the person will not be able to attend a meeting or to join in an activity with others, then there may be a need for the others to be aware that the person cannot attend the meeting or join in. For example, if a professional baseball player is unable to be at a game, then the player's team needs to know this information as soon as possible. In another example, loved ones or relatives may be notified so that they can go see the person or take other actions.

According to an embodiment, a system can comprise one or more memories. The one or more memories can store information regarding a user. For example, the one or more memories can store information regarding contacts of a user. The information regarding the contacts can include the name of the contact, one or more telephone numbers of the contact (such as a home telephone number, an office telephone number, and/or a cellular telephone number), an email address of the contact, a home address of the contact, and any other information that can facilitate contacting of the contact. The one or more memories can contain any information that facilitates emergency auto-notification.

Methods for communicating with the contact can be prioritized and/or categorized. For example, the methods for communicating with the contact can be prioritized such that text messaging is first attempted. If text messaging fails to obtain a response within a predetermined amount of time, then voice messaging can be attempted. If voice messaging fails to obtain a response within a predetermined amount of time, then an email can be sent.

The methods of communicating can be categorized such that different methods of communicating are used for different types of emergencies. For example, text messaging followed by voice messaging can be used for medical emergencies while email is used for traffic delays. Thus, different methods of communications can be used for different types of emergencies and different prioritizations of methods of communications can be used for different types of emergencies.

The information regarding the contacts, such as the information stored in the one or more memories, can include a prioritization and/or categorization of the contacts. The prioritization of the contacts can indicate an order in which the contacts are to be notified in the event of an emergency. The categorization of the contacts can indicate which of the contacts are to be notified in the event of a particular type of emergency.

Communications can be sent to more than one contact. For example, the user's spouse, the user employer, and the user's brother-in-law can be notified in the event of an emergency involving the user. Such communications can be substantially serial or can be substantially in parallel.

The user's schedule can be accessed. Anyone with whom the user is due to meet can be notified of a potential delay or postponement of the meeting. For example, in response to the communication, the system can access the user's Outlook schedule and determine that the user is due at a meeting in thirty minutes. Based upon the nature of the emergency and/or the locations of the user and the meeting place, the system can determine that the user is unlikely to attend the meeting. One or more other participants of the meeting or other responsible persons can be notified that the user will not likely attend the meeting.

Emergency response personnel can be notified of the emergency. The particular organization or emergency response personnel notified can depend upon the nature of the emergency and/or the location of the user. For example, the local (with respect to the location of the user) fire department can be notified if the user is involved in a fire (such as being sensed by smoke and/or heat detectors of the user mobile device). As a further example, the highway patrol can be notified of an emergency such as an automobile accident (such as sensed by accelerometers and/or gyroscopes of the user mobile device) on an interstate highway.

The one or more memories can be one or more memories of a server, a mobile device, or any other device or system. The one or more memories can all be memories of the same device or system. The one or more memories can be memories of different devices and/or systems. For example, the one or more memories can be memories of one or more mobile devices and/or one or more servers.

One or more hardware processors can be in communication with the one or more memories. The one or more hardware processors can be one or more hardware processors of a server, a mobile device, or any other system or device. The one or more hardware processors can be hardware processors of the different devices and/or systems. For example, the one or more hardware processors can be hardware processors of one or more mobile devices and/or one or more servers.

The one or more hardware processors can be operable to facilitate emergency auto-notification. For example, the one or more hardware processors can be operable to receive a first communication from a user mobile device indicative of an emergency regarding the user. In response to the first communication, the one or more hardware processors can be operative to access the contact information in the one or more memories and then determine (at least in part from the contact information) a contact. Determining the contact can comprise determining an identity of the contact and/or determining how the system is to communicate with the contact. For example, the contact can be the user's spouse and the user's spouse can be communicated with via text messaging.

The one or more hardware processors can be operable to send a second communication to the contact regarding the emergency. The second communication can include information regarding the identity of the user, the location of the user, and/or the nature of the emergency. Additionally, biometric information, and/or any other information regarding the user or the emergency can be sent.

The first communication can occur in response to an emergency, such as an emergency that puts the user's life or health at risk. The emergency can be a medical emergency, an accident, a natural disaster, or any other event for which the user may need or desire assistance. For example, the user can be in an emergency room suffering from a heart attack.

The emergency can be an emergency that does not put the user's life or health at risk. For example, the user can be stuck in traffic and late for a scheduled meeting. The system can infer that the user is stuck in traffic and late for a scheduled meeting, such as from the user's Outlook Schedule, the user's GPS location, rate of travel, and an Internet traffic report. The emergency can be any event for which it is desirable that the contact be informed of the event and/or that the contact take action in response to the event.

The first communication can include information that indicates a location of the user. For example, the first communication can include information regarding a GPS location of the user, such as information obtained from the GPS of the user mobile device. The location can be a street address. The location can be a named location, such as Boston General Hospital or McArthur Park.

The location can be based upon any available means of providing such information. For example, the location can be GPS based, cellular telephone base (such as by identifying the nearest cellular telephone tower via which the user is communicating), and/or the location can be Internet based (such as by determining the location of a stationary IP address or the location of a local area network (LAN) via which the user is communicating). The location can be precise or general. For example, the location can include GPS coordinates that are precise to within a few meters. As a further example, the location can merely be a city, state, region, and/or country. For example, if the user is in an airplane crash in the Peruvian Andes, the location can indicate a particular portion of Peru. Location information can also be determined using Bluetooth Low Energy (BLE) with the user's mobile device when the user is a location capable of BLE checkin or communication.

The first communication can include information that indicates the type of the emergency. For example, first communication can include information that indicates whether the emergency is a medical emergency, an accident, a natural disaster, or some other type of emergency. The type of emergency can be used to determine to which contact the second communication is to be sent.

The first communication can include biometric information. The biometric information can be used to determine the type of emergency, the severity of the emergency, and one or more options for responding to the emergency. Examples of such biometric information can include heart rate, respiration, blood pressure, temperature, electrocardiogram, blood chemistry (such as partial pressure of oxygen and glucose level), electroencephalogram, responsiveness (such as indicated by movement in response to stimuli like sound, e.g., ringing, for the mobile device), attitude (standing, sitting, prone, or supine, for example) and the like. The biometric information can include vital signs and/or any other desired information regarding the user.

The biometric information can be assessed onsite (such as at the location of the user by the user mobile device) or can be assessed remotely, such as by the emergency auto-notification system (which can be located anywhere). Assessing the biometric information can result in instructions for treating or caring for the user by emergency responders, bystanders, the user, or anyone else.

The second communication can include instructions for administering therapy to the user. The second communication can include instructions for administering first aid. For example, the second communication can include instructions for treating the user for shock, such as keeping the user warm and monitoring circulation.

The second communication can include information that causes the administration of therapy to the user. For example, the second communication can include signals that cause an insulin pump to administer a prescribed dose of insulin to the user. As a further example, the second communication can include signals that cause a defibrillator to provide defibrillation to the user. As yet a further example, the second communication can include signals that modify operation of a pacemaker of the user. Medical devices, such as the insulin pump, the defibrillator, and the pacemaker can be in communication with the user mobile device, such as via WiFi, Bluetooth, infrared (IR), near field communications (NFC), and the like.

Environmental information can be included in the first communication. For example, the first communication can include ambient temperature, humidity, barometric pressure, radiation levels (such as alpha radiation, beta radiation, gamma radiation, cosmic radiation, x-rays, and neutron radiation), presence of chemicals (including toxins, such as smoke, carbon monoxide, and chlorine), presence of microbes (such as pathogens), video of the user (as well as of others and/or the user's environment), audio of the user (as well as of others, and/or the user's environment), and/or an indication of the presence of other people (as sensed by motion, infrared signature, sound, machine vision, or any other method). The one or more hardware processors can be operable to respond to the biometric information. The response can depend upon the specific biometric information included in the first communication. For example, emergency responder can be warned of excessive carbon monoxide levels. Thus, the response can be defined, at least in part, by a combination of the biometric information and environmental information.

The first communication can include any combination of biometric information, environmental information, and any other available information in communications from the user or from others, or any other information. For example, the first communication can include an identity of the user, the user's location, the user's heart rate, attitude (such as upright, sitting, prone, or supine), video of the user's environment, audio of the user's environment, the ambient temperature, and an indication of the presence of other people.

A plurality of user mobile devices can cooperate to provide enhanced information. A plurality of user mobile devices covering an area can cooperate to provide environment information for the area. For example, during a forest fire, a plurality of user mobile devices can provide temperature, humidity, and wind direction over an area of many acres or square miles and this information can be used by fire fighters to better determine strategies for fighting the fire.

As a further example, during a natural disaster such as a tsunami, hurricane, flood, or earthquake, a plurality of user mobile devices can provide video and audio over an area of several square miles to Federal Emergency Management Agency (FEMA) personnel. In this manner, the FEMA personnel can better manage the emergency.

Thus, the first communication can include information indicative of a type of the emergency. The system can determine the contact and/or the response based, at least in part, on the type of emergency. In this manner, a response that is appropriate with regard to the nature of the emergency can be better assured.

The first communication can be sent in response to the mobile device being at a predefined location and the first communication can include information indicative of the predefined location. Thus, an emergency can be defined as the user being at a predefined location. For example, an emergency can be defined as the user being at an emergency room of a hospital.

An emergency can be defined as the user being at or near a predefined location for a predefine length of time. For example, an emergency can be defined as the user being near the same location on a freeway for an excessive length of time, thus indicating that the user is driving in heavy traffic and will consequently be delayed.

Communication, such as ongoing communication, between the user, the system, the contact, and/or any responders (such as emergency medical personnel) can be provided. Such communication can be bidirectional. Thus, the one or more hardware processors can be operable to facilitate bidirectional communication between the contact and the user mobile device, for example.

Ongoing or extended communication, such as bidirectional communication, can be triggered by an event that can be interpreted as a potential emergency. Such communication can be monitored, such as by a person or device, to determine if an emergency or other situation requiring assistance, requiring a response, requiring further monitoring, or requiring any other action is in progress. Such ongoing monitoring can continue indefinitely. For example, if the user enters an environment that is predefined as hazardous (such as an environment containing a predetermined level of toxins, smoke, radiation, or pathogens), then system can be alerted and bidirectional communication can be initiated and maintained as desired. The bidirectional communication can allow management or responding personnel to ask the user questions about the user's condition, about the condition of others, and/or about the environment.

Once communication, such as unidirectional, bidirectional, data, voice, or video communication, is established, the communication can continue until stopped, such as by the user, the system, or the contact. Thus, extended or ongoing monitoring of the user, the environment, and/or the situation can be provided.

For example, the system can provide bidirectional (or unidirectional) voice, video, text, or data communications. Such communications can be between the user and the contact. In some instances, it may be beneficial to provide such communications with the user, even when the user is otherwise incapable of response. For example, the user may be paralyzed or pinned down and incapable of movement, yet still capable of voice response.

Such communications can be between someone who is with the user (such as medical or emergency response personnel) and the contact. Such communications can be between any two parties.

According to an embodiment, a method can comprise storing contact information for a user, receiving (such as electronically via the one or more hardware processors) a first communication from a user mobile device that is indicative of an emergency regarding the user, accessing (such as via the one or more hardware processors) the contact information in the one or more memories, and determining (such as via the one or more hardware processors and at least in part from the contact information) a contact. In response to receiving the first communication, a second communication can be sent (such as via the one or more hardware processors) to the contact regarding the emergency.

According to an embodiment, a computer program product can comprise a non-transitory computer readable medium. The non-transitory computer readable medium can have computer readable and executable code for instructing one or more processors to perform any of the methods disclosed herein.

The one or more memories and one or more hardware processors can be part of the same device, e.g., server. The one or more memories and one or more hardware processors can be part of the different devices, e.g., servers. The one or more memories and one or more hardware processors can be co-located. The one or more memories and one or more hardware processors can be located in different places, e.g., different rooms, different buildings, different cities, or different states.

Exemplary applications of apparatuses and methods according to one or more embodiments are described herein. These examples are being provided solely to add context and aid in the understanding of the embodiments. It will thus be apparent to one skilled in the art that the embodiments may be practiced without some or all of these specific details. In other instances, well known process steps have not been described in detail in order to avoid unnecessarily obscuring the disclosure. Other applications are possible, such that the following examples should not be taken as limiting.

In this detailed description, references are made to the accompanying drawings, which form a part of the description and in which are shown, by way of illustration, various specific embodiments. Although these embodiments are described in sufficient detail to enable one skilled in the art to practice the embodiments, it is understood that these examples are not limiting, such that other embodiments may be used, and changes may be made without departing from the spirit and scope of the disclosure.

The disclosure relates, in the various described embodiments, to devices, systems and methods involving activities with respect to emergency auto-notification. In various particular embodiments, the systems or methods can involve one or more user devices in communication over a network. Such a network can facilitate a streamlined process involving emergency auto-notification.

While the various examples disclosed herein focus on emergency auto-notification, it will be understood that the various inventive principles and embodiments disclosed herein can be applied to other aspects of electronic commerce, as well.

Systems and Devices

Figure 1:
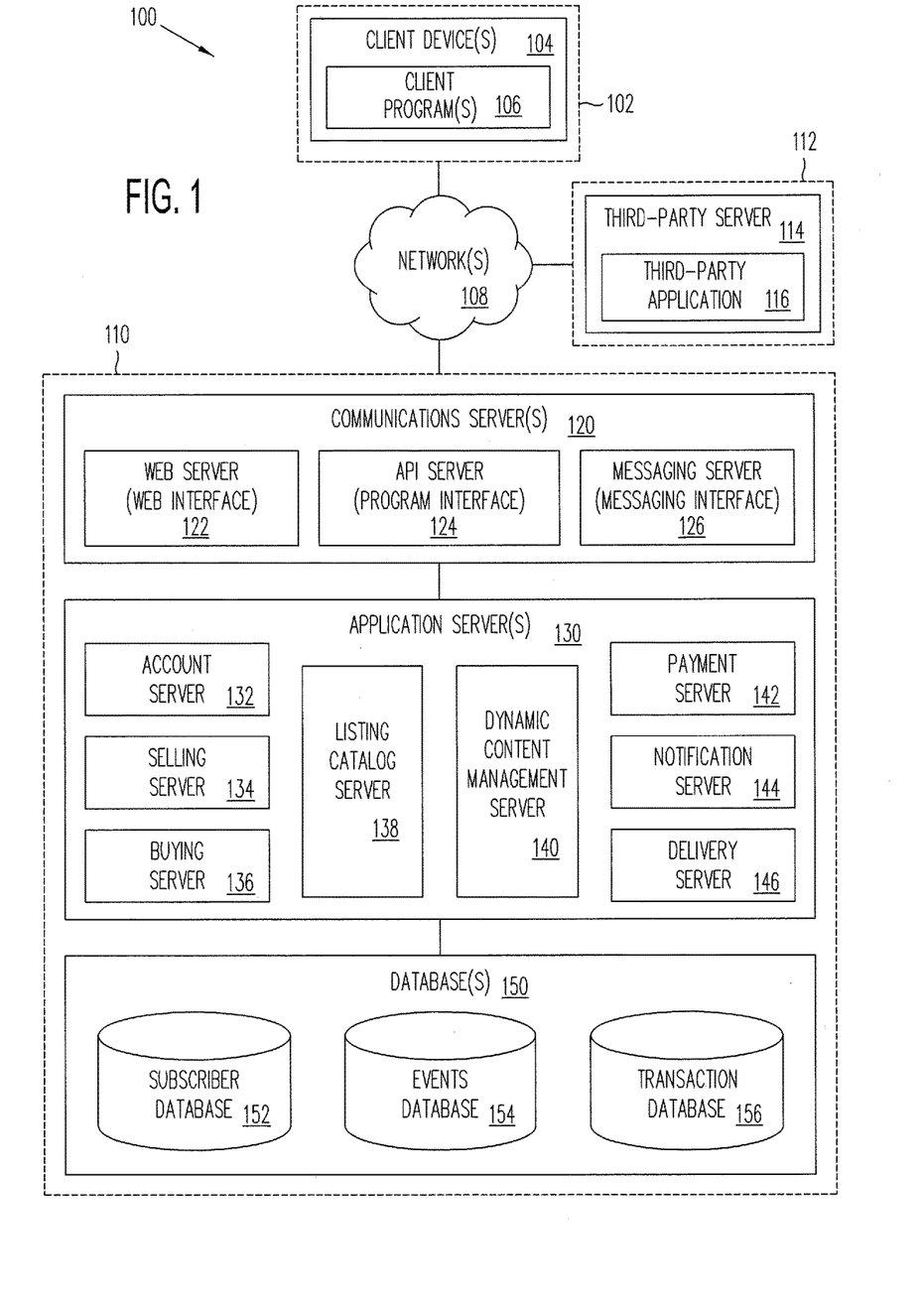
FIG. 1 is a in block diagram of a computing system that is adapted for implementing one or more examples of processes involving activities with respect to emergency auto-notification, according to an embodiment.

Referring now to FIG. 1, an exemplary embodiment of a computing system adapted for implementing one or more processes involving emergency auto-notification is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a mobile computing device, a PC, and/or any other computing device having computing and/or communications capabilities in accordance with the described embodiments. Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102, an institution (e.g., hospital) or other physical location, and/or the network-based system 110 may be sent and received over one or more networks 108 such as the Internet, a WAN, a WWAN, a WLAN, a mobile telephone network, a landline telephone network, a VoIP network, Bluetooth LE, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as emergency auto-notification. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various emergency auto-notification services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an emergency auto-notification system, application servers 130 of network-based system 110 may provide various online marketplace and electronic commerce services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide emergency auto-notification services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
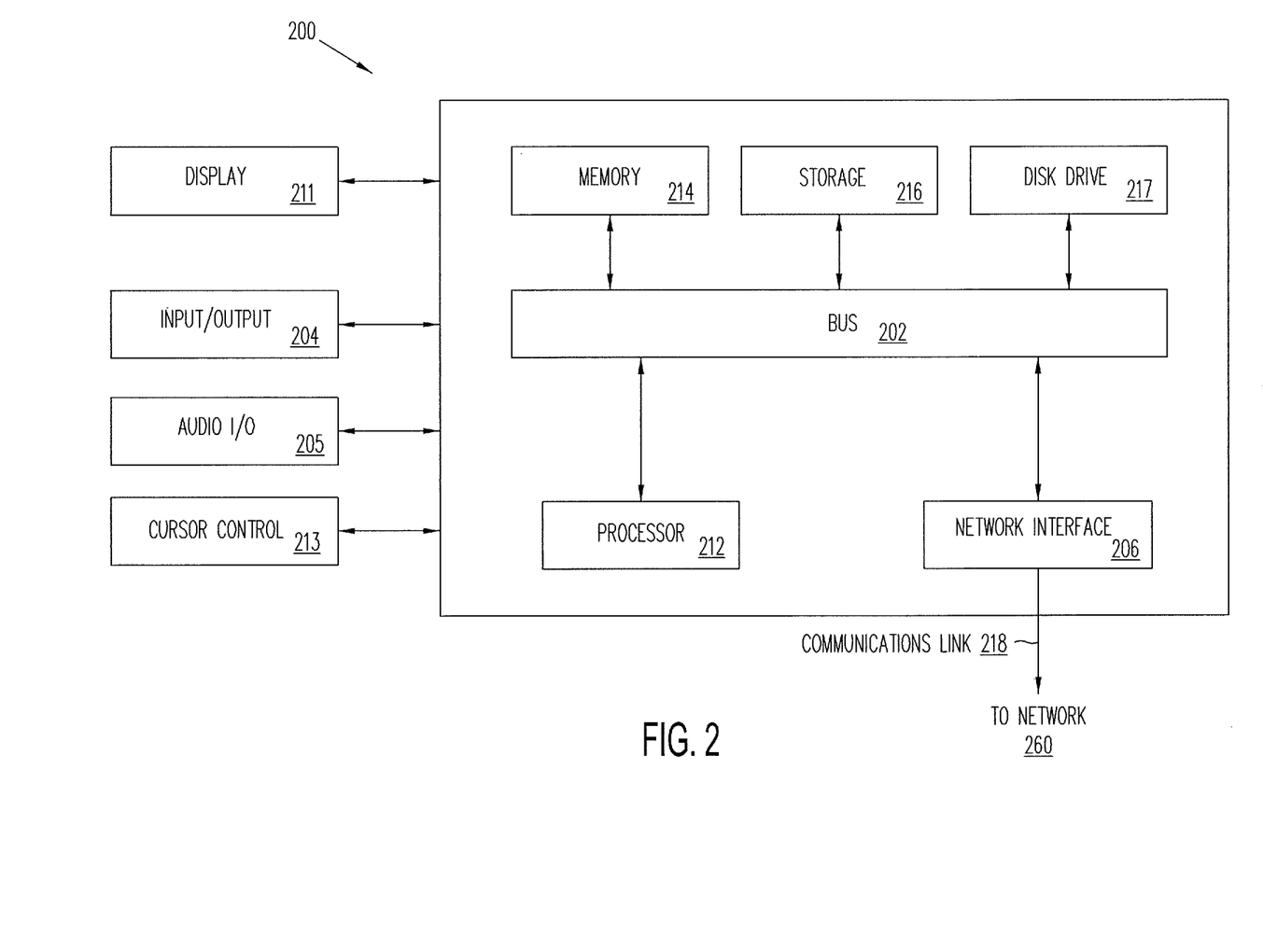
FIG. 2 is a block diagram of an example of a computer system suitable for implementing on one or more devices of the computing system in FIG. 1, according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart phone, a computing tablet, a personal computer, laptop, PDA, Bluetooth device, key FOB, badge, etc.) that is capable of communicating with a network. The emergency auto-notification system and/or a payment provider may utilize a network computing device (e.g., a network server) capable of communicating with the network. It should be appreciated that each of the devices utilized by users, the emergency auto-notification system, and the payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In an embodiment, the transmission is wireless, although other transmission mediums and methods may also be suitable. A processor 212, which can be a micro-controller, digital signal processor (DSP), or other hardware processing component, processes these various signals, such as for display on computer system 200 or transmission to other devices over a network 260 via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In an embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments, execution of instruction sequences for practicing the embodiments may be performed by a computer system. In various other embodiments, a plurality of computer systems coupled by a communication link (e.g., LAN, WLAN, PTSN, or various other wired or wireless networks) may perform instruction sequences to practice the embodiments in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Social networking information can include likes, interests, past events, wants, owns and so forth, such as may be found on social networking websites such as Facebook, YouTube, Twitter, LinkedIn, Yelp, MeetMe, MyYearbook, Google+, MySpace, Pinterest, and the like, among other possible websites. External information can include song or artist lists on a separate user device or profile, as well as data from media websites or applications, such as Pandora, Spotify, iTunes, and the like. Social networking information can be used by the system to determine contacts of the user, medical conditions of the user, treatments for the user, and other useful information for the system.

Emergency Auto-Notification

As will be readily appreciated, the foregoing networks, systems, devices, and numerous variations thereof can be used to implement the emergency auto-notification system described herein. Various other details and features may also be included, as will be appreciated. In various embodiments, one or more systems and methods can notify contacts of the user when the user is involved in an emergency. In this manner, a quicker and more appropriate response to the user can be provided.

As noted with respect to FIG. 2 above, a computer system 200 can include one or more processors 212 and one or more memories or storage devices 214, 216. Such a computer system 200 can be part of a user device, part of one or more servers on a network-based system, or some combination thereof. In particular, a given computing system can include a first memory device or storage component adapted to store information regarding one or more users of the system, as well as a second memory device or storage component adapted to store information regarding an online merchant.

In addition, processor 212, the memory 214 and/or storage 216 can be adapted to facilitate emergency auto-notification. Further functionality of the one or more processors 212 can include facilitating online purchasing, payment (such as for online purchasing or any other reason).

Figure 3:
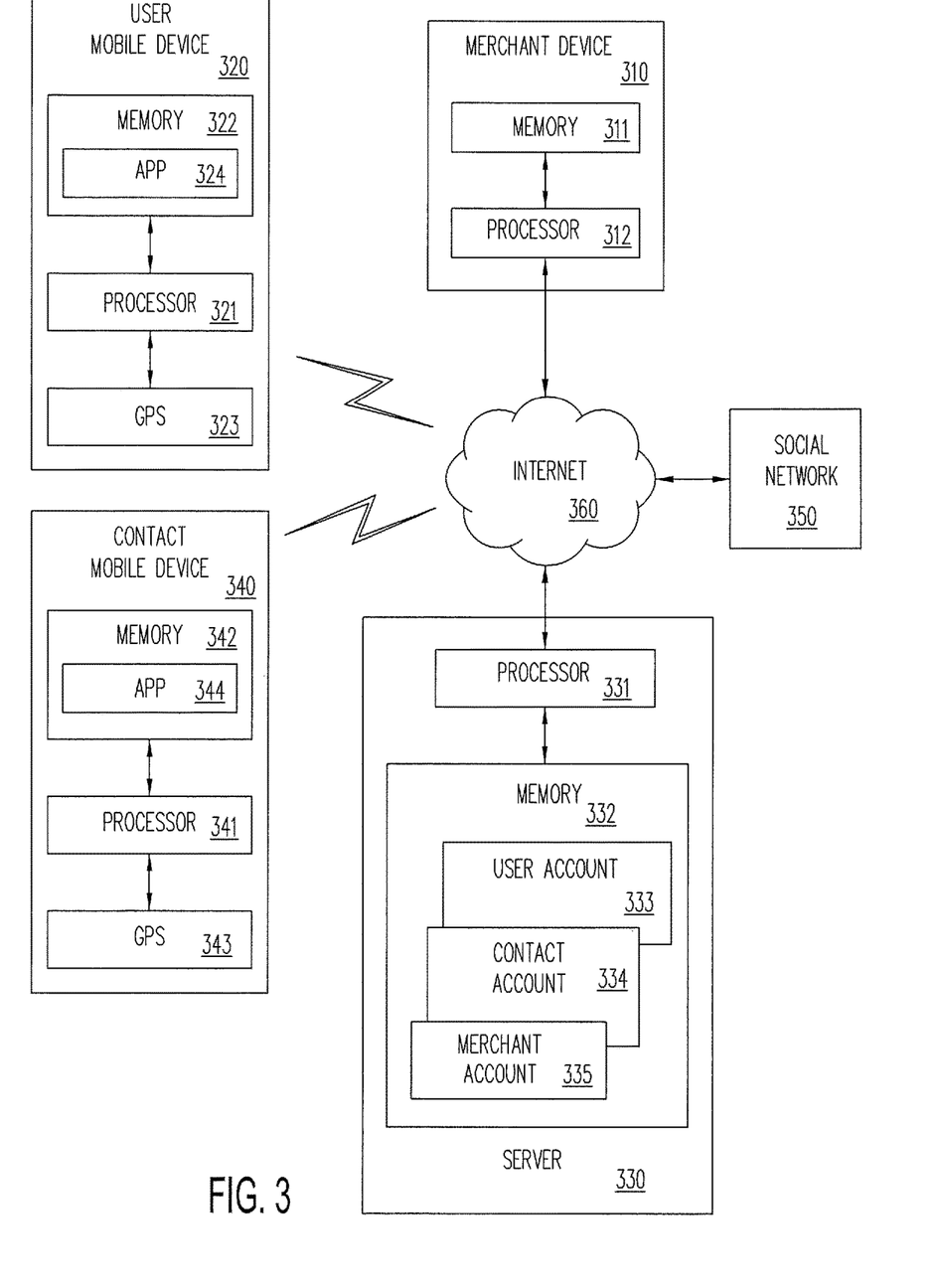
FIG. 3 is a block diagram of a system for emergency auto-notification, according to an embodiment.

FIG. 3 is a block diagram of a system for emergency auto-notification, according to an embodiment. The system can include a merchant device 310, a user mobile device 320, one or more contact mobile device(s) 340, a server 330, and/or a social network 350. The functions and components discussed herein can be split and/or shared among the merchant device 310, the user mobile device 320, the contact mobile device(s) 340, the server 330, the social network 350, and/or any other devices or systems, as desired.

The merchant device 310 can comprise a merchant checkout terminal, a computer, a BLE beacon, and/or a server, for example. The merchant device 310 can include a memory 311 and a processor 312. The merchant device 310 can be used for processing purchases from the merchant. The merchant device 310 can be used by the system for obtaining information regarding the user, such as information regarding a medical condition of the user. For example, the merchant can be a drug store and the medical information can be a list of the user's prescriptions. Thus, the merchant device 310 can provide information that is useful by the system in determining a response to an emergency of the user. Merchant device 310 need not be associated with a merchant, and "merchant" as used herein may apply to hospitals, police stations, doctor offices, and other physical locations associated with emergency situations.

Thus, the merchant device 310 can comprise a beacon. The beacon can be a WiFi device, a Bluetooth device (such as a BLE device), or any other device that is capable of functioning as a beacon. The beacon can be a wireless device that provides a signal to the user mobile device 320, such as via radio, infrared (IR), ultrasound, or any other method. The beacon can be an optical device. The beacon can be any device that the user mobile device 320 can recognize and/or that the user mobile device 320 can obtain a signal from, wherein the signal is indicative of the location of the user mobile device 320.

The merchant device 310 can be a device of a merchant, hospital (such as an emergency room), clinic, doctor's office, or any other place or entity. For example, the beacon can be a WiFi device or a BLE device in or proximate the emergency room of a hospital. The merchant device 310 can be at any location.

The beacon can be a device that is not intended to function as a beacon and that provides an indication of location. The beacon can be any device that has a recognizable or characteristic electromagnetic signature which can provide an indication of location. For example, the beacon can be an electronic device that is commonly used in an emergency room, a doctor's office, an ambulance, or a hospital, and that is not commonly used elsewhere. For example, the beacon can be an electrocardiogram (ECG) machine. The beacon can be any device or combination of devices that provide the user mobile device 320 with a signal or a combination of signals that tend to indicate a location of the user mobile device 320. Thus, when the user is near such a device or combination of devices, one or more contacts can be informed that a potential emergency exists.

The location of the merchant device 310 can be a location where the user is likely to go or to which the user is likely to be transported (such as by an ambulance) in response to an emergency of the user. For example, if the user is seriously hurt in an automobile accident, then the user is likely to go to an emergency room. Thus, according to an embodiment, one or more contacts can be notified when the user is in an emergency room.

The beacon can be a combination of devices. For example, the beacon can be a combination of electronic devices that are commonly found in an ambulance. The combination of electronic devices can provide an electromagnetic signature that is unique to ambulances in general and/or that is unique to a particular ambulance. For example, the beacon can comprise an ECG machine, a defibrillator, and the ambulance's ignition system (such as the ambulance's alternator combined with the ambulance's spark plugs). Such a combination of devices can provide an electromagnetic signature that is unique to ambulances in general and/or that is unique to the particular ambulance.

After the user mobile device 320 has received a signal from the beacon, the user mobile device 320 can use GPS, such as GPS 323, to determine the location of the user mobile device 320, and thus to determine the location of the user. The GPS location of the user can be provided to the server 330, for example. Thus, the merchant device 310, e.g., the beacon, can trigger the communication and the GPS 323 can provide the location information in response to such triggering.

The user mobile device 320 can be carried by the user. The user mobile device 320 can comprise a cellular telephone, a smart telephone, a hand held computer, a laptop computer, a notebook computer, or a tablet computer, for example. The user mobile device 320 can comprise a dedicated device for use primarily or only with the emergency auto-notification system. The user mobile device 320 can include a processor 321, a memory 322, and a global positioning system (GPS) 323. The user mobile device 320 can be used for routine telephone calls, text messaging, web browsing, and the like. The user mobile device 320 can be used for monitoring biometrics of the user, monitoring the environment of the user, sensing emergencies, sending the first communication, receiving instructions, for example.

The user mobile device 320 can comprise any desired sensors. Such sensors can be built into the user mobile device 320. Such sensors can be in communication (wired or wireless) with the user mobile device 320. For example, the user mobile device 320 can comprise an ambient temperature sensor, a humidity sensor, a barometric pressure sensor, a radiation sensor, a chemical sensor, a microbe sensor, attitude/motions sensors (such as accelerometers and/or gyroscopes), a video camera and/or still camera, and a microphone. The user mobile device 320 can be configured to communicate with sensors that are remote with respect to the user mobile device 320.

Sensors, such as the ambient temperature sensor, the humidity sensor, the barometric pressure sensor, the radiation sensor, the chemical sensor, the microbe sensor, the attitude/motions sensors, the video camera, the still camera, and the microphone can be built into the user mobile device 320. Sensors, such as those associated with an electrocardiograph, body temperature monitoring, respiration rate monitoring, blood pressure monitoring, heart rate monitoring, and the like, can be attached to the user mobile device via wires. Such sensors can communicate with the user mobile device either via wires or wirelessly (such as via near field communications (NFC) methods or other short range communications methods, such as infrared (IR), Bluetooth, WiFi, and WiMax).

An app 324 can be stored in the memory 322 and executed by the processor 321. The app 324 can be used for monitoring biometrics of the user, monitoring the environment of the user, sensing emergencies, sending the first communication, receiving instructions, for example.

One or more contact mobile devices(s) 340 can be carried by one or more contacts. Each contact mobile device(s) 340 can comprise a cellular telephone, a smart telephone, a hand held computer, a laptop computer, a notebook computer, or a tablet computer, for example. Each contact mobile device(s) 340 can include a processor 341, a memory 342, and a global positioning system (GPS) 343. Each of the contact mobile device(s) 340 can be used for routine telephone calls, text messaging, web browsing, and the like. Each of the contact mobile device(s) 340 can be used for receiving notification regarding an emergency of the user. The contact mobile device(s) 340 can be the same as the user mobile device 320 or can be different with respect thereto.

An app 344 can be stored in the memory 342 and executed by the processor 341. The app 344 can be used for monitoring biometrics of the user, monitoring the environment of the user, sensing emergencies, sending the first communication, and/or receiving instructions, for example.

The server 330 can comprise a server of an online seller, such as eBay, can be a server of a payment provider, such as Paypal, Inc., land/or can be a server of a dedicated emergency notification provider or any other entity. The server 330 can be a single server or can be a plurality of servers. The server 330 can include one or more processors 331 and a memory 332. The memory 332 can be a memory of the server 330 or a memory that is associated with the server 330. The memory 332 can be a distributed memory. The memory 332 can store a user account 333 and a merchant account 334. The server 330 can be used for online sales, facilitating payments, emergency auto-notification, and/or any other reason. The server 330 can be used for receiving the first communication, accessing the contact information, determining one or more contacts, determining a response to the first communication, and/or sending the second communication. The server can be used to practice any desired portion of the emergency auto-notification system.

Generally, the merchant device 310, the user mobile device 320, the contact mobile device(s) 340, and the payment server 330 can perform functions discussed herein. That is, at least to some extent, a function that is discussed herein as being performed via a particular one of these devices can be performed by a different one of these devices, by a combination of these devices, and/or by other devices.

The merchant device 310, the user mobile device 320, the contact mobile device(s) 340, the social network 350, and the server 330 can communicate with one another via a network, such as the Internet 360. The merchant device 310, the mobile device 320, the contact mobile device(s) 340, the social network 350, and the server 330 can communicate with one another via one or more networks, such as local area networks (LANs), wide area networks (WANs), cellular telephone networks, and the like. The merchant device 310, the user mobile device 320, the other mobile devices 330, the social network 350, the social network 350, and the server 330 can communicate with one another, at least partially, via one or more near field communications (NFC) methods or other short range communications methods, such as infrared (IR), Bluetooth, WiFi, and WiMax.

Information regarding the user, such as a medical condition of the user can be obtained by the system for the social network 350. Similarly, information regarding contacts of the user, such as identities of the contacts, telephone numbers of the contacts, and email addresses of the contacts, can be obtained by the system for the social network 350.

Methods

Figure 4:
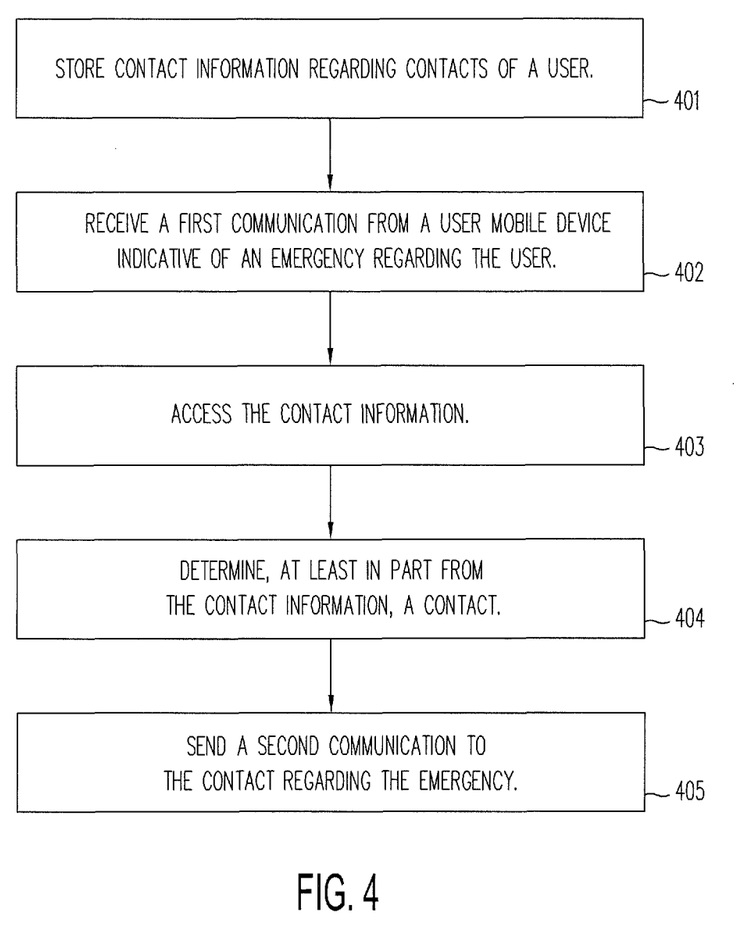
FIG. 4 is a flow chart of a method for emergency auto-notification, according to an embodiment.

FIG. 4 is a flow chart shown a method for emergency auto-notification, according to an embodiment. Note that one or more of the steps described herein may be combined, omitted, or performed in a different order, as desired or appropriate.

One or more memories can store contact information regarding contacts of a user, as shown in step 401. For example, the one or more memories can be one or more memories of the server 330. The one or more memories can be one or more memories of any device or system. For example, the one or more memories can be one or more memories of the user mobile device 320, the merchant mobile device 310, the social network 350, the contact mobile device 340, or any other system or device.

One or more hardware processors can receive a first communication from a user mobile device that is indicative of an emergency regarding the user, as shown in step 402. For example, the one or more hardware processors can be one or more hardware processors of the server 330. The one or more hardware processors can be one or more hardware processors of any device or system. For example, the one or more memories can be one or more hardware processors of the user mobile device 320, the merchant mobile device 310, the social network 350, the contact mobile device 340, or any other system or device.

The first communication can be a notification that the emergency has occurred, as well as information related to the emergency. The information can be information that better facilitates an appropriate response to the emergency. The communication can be triggered by a device, such as the user device 320. The communication can be triggered by the user or another person.

The one or more hardware processors can access the contact information in the one or more memories, as shown in step 403. The one or more hardware processors can obtain contact information from any available source or combination of sources. For example, the one or more hardware processors can obtain information from the user's Outlook contact, from the Outlook contacts of another, from the user's social network website, and/or from a social network website of another.

The one or more hardware processors can determine, at least in part from the contact information, a contact, as shown in step 404. The one or more hardware processors can determine a plurality of contacts. The contacts can be prioritized, such as according to prioritization information provided by the user during a set up process.

The one or more hardware processors can send a second communication to the contact regarding the emergency, as shown in step 405. The one or more hardware processors can repeat communications to the same contact and/or can send communications to more than one contact. The communication can be sent via the user device, such that the recipients of the communication may see from whom the communication came from, e.g., the user device as opposed to a reporting service.

The one or more memories and/or the one or more processors can be one or more memories and/or the one or more processors of the merchant device, 310, the user device 320, the server 330, the social network 350, and/or any other device or system. Memories and/or processors from any number of devices, systems, and entities can cooperate to perform the emergency auto-notification method disclosed herein.

In implementation, at least some of the various embodiments may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In an embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the embodiments.

According to an embodiment, the contacts, the user, the criteria for defining emergencies, and/or the response to emergencies (such as the second communication) can be either predefined, such as during a set up process for the system, or can not be predefined. For example, artificial intelligence, heuristics, or adaptive/self-evolving programming can be used to define the contacts, the user, the criteria for defining emergencies, and/or the response to emergencies. Contacts, for example, can be determined from social media, emails, contact lists (such as those of Outline contacts), previously used telephone numbers, and the like.

The emergency auto-notification system can use information from databases, such as those of an online seller, such as, for example, eBay Inc. of San Jose, Calif. or those of an online payment provider, such as PayPal, Inc. of San Jose, Calif. Such databases can be used to obtain information regarding a medical condition of the user and/or contact information for contacts of the user. For example, if the user regularly orders glucose monitoring equipment via eBay and/or pays for such equipment via PayPal, it can be inferred by the system that the user is diabetic. As a further example, if the user regularly has eBay purchases shipped to an address other than the user's address, it can be inferred by the system that a contact for the user may reside at this address. An attempt can be made to notify the contact at this address, such as by the system and/or local law enforcement personnel.

According to an embodiment, the contact notified by the system can, itself, be an automated system. The automated system can then contact others, such as emergency responders.

According to an embodiment, the notification of the user's condition can include information such as a diagnosis, treatment required or suggested, GPS location, directions to the user, and/or any other useful information. The system can query an automated diagnosis system to determine the diagnosis or treatment required, for example.

As used herein, the term "emergency" can include any event for which the user or another desires that a communication be sent to one or more contacts. An emergency can be an event that puts the health, wellbeing, life, property, schedule, or other aspect of the user or another at risk. Examples of emergencies include events wherein the user is in an emergency room having a heart attack, wherein the user is camping in the wilderness and is in a diabetic coma, wherein the user is in a traffic accident, and wherein the user uninjured and stuck in traffic.

As used herein, the term "contact" can include any person, group of people, device, system, or the like. For example, a contact can be the user's spouse. As a further example, the contact can be a dedicated server that is configured to receive communications regarding emergencies and to respond to such communications. Contacts can be relatives, friends, co-workers, and emergency responders (such as emergency medical technicians, physicians, firemen, and the like). The user's physician can be a contact. The user's boss can be a contact.

As used herein, the terms "first communication" and "second communication" can each include one or more communications. Thus, the first communication can include a series of separate communications and the second communication can include a series of separate communications. Each communication can be analog or digital. Each communication can be any type of signal, packet, or other communication element that transfers information, such as to or from the user, the system, and others.

As used herein, the term "network" can include one or more local area networks (LANs) such as business networks, one or more wide area networks (WANs) such as the Internet, one or more cellular telephone networks, or any other type or combination of electronic or optical networks.

One or more embodiments can provide methods and systems that facilitate emergency auto-notification. The emergency auto-notification can help to provide an immediate and appropriate response to an emergency, such as when a user who requires help is unable to communicate, e.g. is unable to request help. In this manner, lives and property can be saved.

The foregoing disclosure is not intended to limit the disclosure to the precise forms or particular fields of use disclosed. It is contemplated that various alternate embodiments and/or modifications, whether explicitly described or implied herein, are possible in light of the disclosure. Having thus described various example embodiments of the disclosure, persons of ordinary skill in the art will recognize that changes may be made in form and detail without departing from the scope of the disclosure. Thus, the disclosure is limited only by the claims

What is claimed is:

1. A system comprising:
one or more processors, one or more computer-readable memories, one or more computer-readable tangible storage devices, and program instructions stored on at least one of the one or more storage devices, the one or more processors configured to execute the program instructions via at least one of the one or more memories to cause the system to perform operations comprising:
receiving a first communication from a device of a user;
in response to determining that the first communication is indicative of an emergency regarding the user, determining a contact associated with the user based on:
referencing a calendar associated with the user,
identifying an event within the calendar, and
identifying that the contact is associated with the event;
determining a medium to utilize for communicating with the contact based on a type of the emergency, wherein the type of emergency is determined by: utilizing one or more sensors to detect biometric information associated with the user, and comparing the detected biometric information to predefined biometric information associated with the user; and
sending a second communication, via the determined medium, to the contact, wherein the second communication includes information detailing the emergency.

2. The system of claim 1, wherein determining that the first communication is indicative of an emergency is based on one or more environment conditions associated with an environment of the user.

3. The system of claim 2, wherein the one or more environmental conditions includes one or more of an ambient temperature, a barometric pressure, radiation levels, information detailing the presence of chemicals, information detailing the presence of microbes, a video of the environment, or audio of the environment.

4. The system of claim 1, wherein the determining a medium to utilize for communicating with the contact is further based on a relationship that the contact has with the user.

5. The system of claim 1, wherein:
the first communication includes information indicative of a type of the emergency; and
determining the contact is further based on the type of emergency.

6. The system of claim 1, wherein:
the first communication is sent in response to the mobile device being at a predefined location; and
wherein the first communication includes information indicative of the predefined location.

7. The system of claim 1, further comprising facilitating bidirectional communication between the contact and the user mobile device.

8. A method comprising:
receiving a first communication from a device of a user;
in response to determining that the first communication is indicative of an emergency regarding the user, determining a contact associated with the user based on:
referencing a calendar associated with the user,
identifying an event within the calendar, and
identifying that the contact that is associated with the event;
determining, a medium to utilize for communicating with the contact based on a type of the emergency, emergency is determined by: utilizing one or more sensors to detect biometric information associated with the user, and comparing the detected biometric information to predefined biometric information associated with the user; and
sending a second communication to the contact by way of the determined medium, wherein the second communication includes information detailing the emergency.

9. The method of claim 8, wherein determining that the first communication is indicative of an emergency is based on one or more environment conditions associated with an environment of the user.

10. The method of claim 9, wherein the one or more environmental conditions includes one or more of an ambient temperature, a barometric pressure, radiation levels, information detailing the presence of chemicals, information detailing the presence of microbes, a video of the environment, or audio of the environment.

11. The method of claim 8, wherein the determining a medium to utilize for communicating with the contact is further based on a relationship that the contact has with the user.

12. The method of claim 8, wherein:
the first communication includes information indicative of a type of the emergency; and
determining the contact is further based on the type of emergency.

13. The method of claim 8, wherein:
the first communication is sent in response to the mobile device being at a predefined location; and
wherein the first communication includes information indicative of the predefined location.

14. The method of claim 8, further comprising facilitating bidirectional communication between the contact and the user mobile device.

15. A non-transitory machine-readable medium having stored thereon machine-readable instructions executable to cause a machine to perform operations comprising:
receiving a first communication from a device of a user;
in response to determining that the first communication is indicative of an emergency regarding the user, determining a contact associated with the user based on:
referencing a calendar associated with the user,
identifying an event within the calendar, and
identifying that the contact that is associated with the event;
determining a medium to utilize for communicating with the contact based on a type of the emergency, wherein the type of emergency is determined by: utilizing one or more sensors to detect biometric information associated with the user, and comparing the detected biometric information to predefined biometric information associated with the user; and sending a second communication, via the determined medium, to the contact, wherein the second communication includes information detailing the emergency.

16. The non-transitory machine-readable medium of claim 15, wherein determining that the first communication is indicative of an emergency is based on one or more environment conditions associated with an environment of the user.

17. The non-transitory machine-readable medium of claim 16, wherein one or more environmental conditions includes one or more of an ambient temperature, a barometric pressure, radiation levels, information detailing the presence of chemicals, information detailing the presence of microbes, a video of the environment, or audio of the environment.

18. The non-transitory machine-readable medium of claim 15, wherein the determining a medium to utilize for communicating with the contact is further based on a relationship that the contact has with the user.

19. The non-transitory machine-readable medium of claim 15, wherein:
the first communication includes information indicative of a type of the emergency; and
determining the contact is further based on the type of emergency.

20. The non-transitory machine-readable medium of claim 15, wherein:
the first communication is sent in response to the mobile device being at a predefined location; and
wherein the first communication includes information indicative of the predefined location.

21. The non-transitory machine-readable medium of claim 15, further comprising facilitating bidirectional communication between the contact and the user mobile device.

* * * * *

UNITED STATES PATENT AND TRADEMARK OFFICE
CERTIFICATE OF CORRECTION

| | | |
|---|---|---|
| PATENT NO. | : 9,633,549 B2 | Page 1 of 1 |
| APPLICATION NO. | : 14/031631 | |
| DATED | : April 25, 2017 | |
| INVENTOR(S) | : Nathan Lyman, Roy Leon Camp and David Eramian | |

It is certified that error appears in the above-identified patent and that said Letters Patent is hereby corrected as shown below:

In the Claims

In Column 20, Lines 14-15, change "emergency is determined by:" to --wherein the type of emergency is determined by:--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*